Patented June 17, 1941

2,245,591

UNITED STATES PATENT OFFICE 2,245,591

STEERING BY DRIVING MECHANISM

Byron Q. Jones, Fort Knox, Ky.

Application July 2, 1940, Serial No. 343,563

5 Claims. (Cl. 180—9.2)

(Granted under the act of March 3, 1883, as amended April 30, 1928; 370 O. G. 757)

The invention described herein may be manufactured and used by or for the Government for governmental purposes, without the payment to me of any royalty thereon.

The subject of this invention is a steering by driving mechanism designed primarily for self propelled vehicles of the track-laying type in which a separate engine is provided for each track.

The purpose of the invention is to provide a power transmission in which a pair of interconnected differentials are arranged to permit either or both of two engines to drive either or both of two tracks to accomplish steering by driving, and to provide for flexibility in the positioning of the driving and driven shafts.

The specific nature of the invention as well as other objects and advantages thereof will clearly appear from a description of a preferred embodiment as shown in the accompanying drawing in which.

Figure 1:
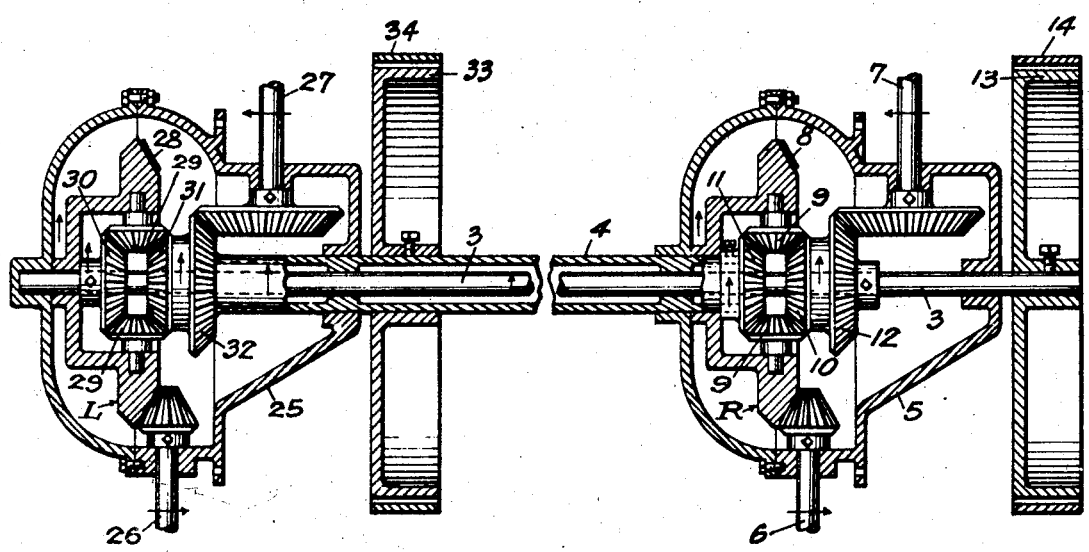
Fig. 1 is a transverse sectional view with parts in elevation of the improved mechanism.

Referring to the drawing by characters of reference there is shown a pair of similar differential gear units R and L whose casings 5 and 25 are connected by a rotatable shaft 3 and a rotatable sleeve 4. The differential units are arranged for convenient association with a pair of independent power plants or engines with independent clutches and transmissions (not shown) and with a pair of endless tracks (not shown) and include driving shafts 6 and 26 leading from the engines and driven shafts 7 and 27 leading to the tracks.

Within the similar casings 5 and 25 are ring gears 8 and 28, the gear 8 being rotatably mounted on the sleeve 4 and the gear 28 being rotatably mounted on the shaft 3. Planetary gears 9 and 29 respectively mounted in the ring gears 8 and 28 mesh with sun gears 10 and 30 fixed on the inner shaft 3 and with sun gears 11 and 31 fixed on the outer ends of the sleeve 4.

The shaft 7 is driven from the shaft 3 through a pinion 12 which may be integral with sun gear 10 and the shaft 27 is driven from the sleeve 4 through a pinion 32 which may be integral with sun gear 31.

A brake drum 13 fixed on the shaft 3 is adapted to be braked by a band 14 and a brake drum 33 fixed on the sleeve 4 is adapted to be braked by a band 34.

In operation, when power is transmitted through the driving shafts 6 and 26 the action of the differentials is normal and the driven shafts 7 and 27 will be rotated in the same direction as indicated by the arrows and at the same speeds so that the vehicle will move on a straight course.

Figure 2:
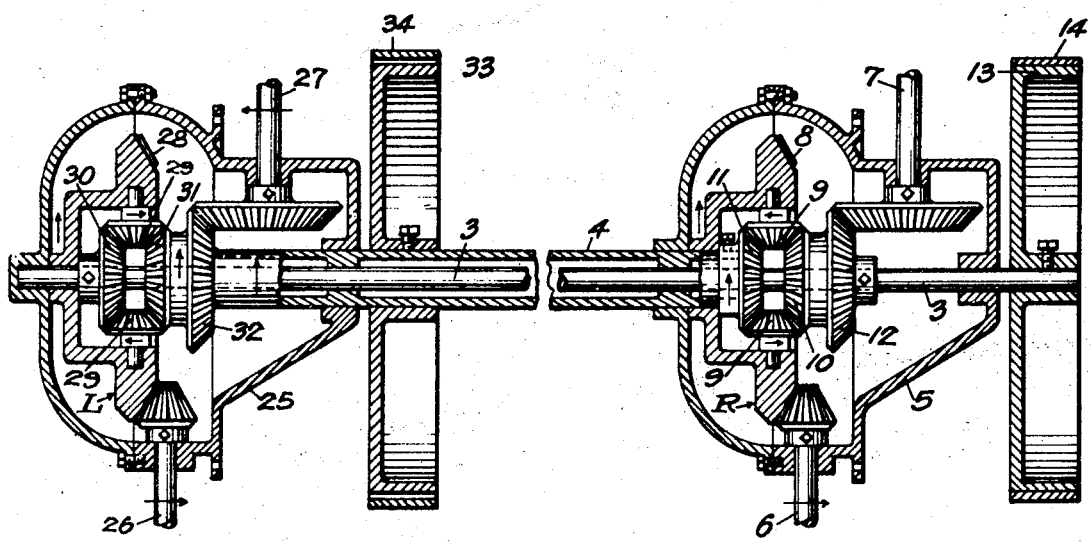
Fig. 2 is a similar view with one of the brakes applied.

When it is desired to make a right turn the band 14 is applied to brake drum 13 to retard or lock the shaft 3 and driven shaft 7. In this situation the gears will rotate as indicated by the arrows in Fig. 2 and all of the power from both drive shafts 6 and 26 will be transmitted to shaft 27. Conversely if the brake band 34 is applied all the power from both drive shafts will be transmitted to the driven shaft 7.

Should either shaft 6 or 26 become inoperative from the standpoint of applied engine power, the power from the operative shaft will be transmitted to both of the driven shafts 7 and 27 in accordance with the principle of the single differential distribution of power.

With only one of the drive shafts 6 or 26 applying power, the above described operation of the brakes with respect to the control of power transmitted to the driven shafts 7 and 27 will be the same.

Having now described my invention what I claim is:

1. In a steering by driving mechanism, a pair of differential gear casings, a shaft rotatably mounted in said casings, a pair of sun gears fixed on the shaft with one gear disposed in each casing, a sleeve coaxial with the shaft and rotatably mounted in said casings, a pair of sun gears fixed on the sleeve with one gear disposed in each casing, a ring gear rotatably mounted on the shaft, planetary gears carried by said ring gear and meshing with the sun gears in one casing, a ring gear rotatably mounted on the sleeve, planetary gears carried by said ring gear and meshing with the sun gears in the other casing, means for braking the shaft, means for braking the sleeve, independent means for driving the ring gears, and means for taking power from the shaft and sleeve.

2. In a steering by driving mechanism, a rotatable shaft, a pair of sun gears on the shaft, a rotatable sleeve coaxial with the shaft, a pair of sun gears on the sleeve, a ring gear rotatably mounted on the shaft, planetary gears carried by the ring gear and meshing with one sun gear on the shaft and one sun gear on the sleeve, a ring gear rotatably mounted on the sleeve, planetary gears carried by said ring gear and meshing with the other sun gear on the shaft and the other sun gear on the sleeve, means for braking the shaft, means for braking the sleeve, independent means for driving the ring gears, and means for taking power from the shaft and sleeve.

3. In a steering by driving mechanism, a pair of spaced differential gear units each including a ring gear, an independent drive for each unit, a first connecting member with a sun gear for each unit and mounting the ring gear of one unit, a second connecting member with a sun gear for each unit and mounting the ring gear of the other unit, a driven member on the first connecting member, a driven member on the second connecting member, means for braking the first connecting member, and means for braking the second connecting member.

4. In a steering by driving mechanism, a pair of differential gear units including two pairs of sun gear members each pair common to both differential gear units, means for braking the sun gear members, and a pair of independent drive shafts one for each differential gear unit.

5. In a steering by driving mechanism, a pair of interconnected differential gear units, an independent drive leading to each unit for actuating the interconnected differential gear units, a driven member for each unit, and means for braking each driven member.

BYRON Q. JONES.